United States Patent
Amuru et al.

(10) Patent No.: US 10,412,710 B2
(45) Date of Patent: Sep. 10, 2019

(54) METHOD AND SYSTEM FOR IMPLEMENTING MULTIPLE-ACCESS IN WIRELESS COMMUNICATION SYSTEM

(71) Applicant: Samsung Electronics Co., Ltd., Suwon-si, Gyeonggi-do (KR)

(72) Inventors: Saidhiraj Amuru, Karnataka (IN); Anshuman Nigam, Karnataka (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/699,781

(22) Filed: Sep. 8, 2017

(65) Prior Publication Data

US 2018/0070335 A1    Mar. 8, 2018

(30) Foreign Application Priority Data

Sep. 8, 2016  (IN) .............................. 201641030726
Jun. 12, 2017 (IN) .............................. 201641030726

(51) Int. Cl.
*H04L 1/00*    (2006.01)
*H04W 72/04*   (2009.01)
(Continued)

(52) U.S. Cl.
CPC .......... *H04W 72/04* (2013.01); *H04L 5/0044* (2013.01); *H04L 5/0091* (2013.01);
(Continued)

(58) Field of Classification Search
CPC .... H04L 5/0003; H04L 5/0007; H04L 5/0044
(Continued)

(56) References Cited

U.S. PATENT DOCUMENTS 9,743,423 B2* 8/2017 Liu ...................... H04L 1/0003
2015/0009910 A1  1/2015 Ryu et al.
(Continued)

FOREIGN PATENT DOCUMENTS

WO    2014135126 A1    9/2014

OTHER PUBLICATIONS

ISA/KR, "International Search Report," International Application No. PCT/KR2017/009857, dated Dec. 28, 2017, 3 pages.
(Continued)

*Primary Examiner* — William D Cumming

(57) ABSTRACT

Embodiments herein relate to a pre-$5^{th}$-Generation (5G) or 5G communication system to be provided for supporting higher data rates in a Beyond $4^{th}$-Generation (4G) communication system such as Long Term Evolution (LTE). Embodiments herein disclose a system for multiple-access in a wireless communication system. The system includes a base station (BS) configured to implement an uplink transmission configuration including a resource pool having a plurality of resource blocks (RBs) allocated to support a contention-based multiple access or a grant-free multiple access. The BS is configured to signal the resource pool to a plurality of UEs. The UE from the plurality UEs is configured to receive the resource pool from the BS and send an uplink transmission to the BS by accessing at least one RB from the plurality of RBs allocated in the resource pool.

20 Claims, 17 Drawing Sheets

(51) Int. Cl.
    *H04W 72/14*   (2009.01)
    *H04L 5/00*    (2006.01)
    *H04W 74/08*   (2009.01)
(52) U.S. Cl.
    CPC ......... *H04W 72/042* (2013.01); *H04W 72/14* (2013.01); *H04W 74/08* (2013.01)
(58) Field of Classification Search
    USPC .......................................................... 370/329
    See application file for complete search history.

(56)            References Cited

U.S. PATENT DOCUMENTS

| 2017/0034845 | A1* | 2/2017  | Liu   | H04L 1/0003 |
| 2017/0318604 | A1* | 11/2017 | Liu   | H04L 1/0003 |
| 2018/0035406 | A1* | 2/2018  | Hao   | H04L 5/0007 |
| 2018/0070335 | A1* | 3/2018  | Amuru | H04L 5/0044 |

OTHER PUBLICATIONS

ISA/KR, "Written Opinion of the International Searching Authority," International Application No. PCT/KR2017/009857, dated Dec. 28, 2017, 7 pages.

Huawei, Hisilicon, "Discussion on grant-free transmission," R1-166095, 3GPP TSG RAN WG1 Meeting #86, Gothenburg, Sweden, Aug. 22-26, 2016, 7 pages.

Samsung, "Discussion on grant-free/contention-based non-orthogonal multiple access," R1-166752, 3GPP TSG RAN WG1 Meeting #86, Gothenburg, Sweden, Aug. 22-26, 2016, 7 pages.

ZTE, ZTE Microelectronics, "Grant-free Multiple Access Schemes for mMTC," R1-166403, 3GPP TSG RAN WG1 Meeting #86, Gothenburg, Sweden, Aug. 22-26, 2016, 7 pages.

* cited by examiner

METHOD AND SYSTEM FOR IMPLEMENTING MULTIPLE-ACCESS IN WIRELESS COMMUNICATION SYSTEM

CROSS-REFERENCE TO RELATED APPLICATION AND CLAIM OF PRIORITY

This application is related to and claims priority to Indian Patent Application Nos. 201641030726 filed on Sep. 8, 2016 and 201641030726 filed Jun. 12, 2017, the contents of which are incorporated herein by reference.

TECHNICAL FIELD

The present disclosure relates to a wireless communication, and more particularly to a method and system for implementing multiple-access in a wireless communication system.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

An Orthogonal Frequency-Division Multiple Access (OFDMA), as used in a Long Term Evolution (LTE), requires strict orthogonal requirements between different users and same set of resources cannot be re-used across different users. However, with advances in multi user detection algorithms, the same set of resources are now possible to support multiple users (with distinguishing features such as different codes from a fixed codebook, power levels, different interleavers etc.) on same set of resource blocks and yet successfully decode each user's data successfully. The multi user detection algorithms are broadly referred to as non-orthogonal multiple access techniques. Further, In the LTE, Multiple Input, Multiple Output (MIMO) techniques are used in a downlink signal to support multiple users simultaneously on the same set of resources. However in an uplink signal, strict orthogonality is maintained. However, this may not be the case to be used for the wireless system as this may impose several restrictions on scheduling the massive number of users.

Further, several new multiple access schemes have been proposed in existing systems/existing methods to support the non-orthogonal multiple access techniques. These techniques help to re-use the resources so as to improve the spectral efficiency of an overall network and also enable to support massive number of users which is a requirement for Massive Machine Based Communication (mMTC), one of the services supported by new radio access technologies. Owing to the various requirements of the various services that will be supported by New Radio (NR) (ultra-reliable and low latency communications (URLLC), mMTC and enhanced Mobile Broadband (eMBB)), different multiple access schemes may be used for different services.

However, various multiple access schemes have advantages and disadvantages with respect to various parameters (e.g., latency, reliability of a transmission, a spectral efficiency or the like). Thus, it is desired to address the above mentioned disadvantages or other shortcomings or at least provide a useful alternative.

SUMMARY

To address the above-discussed deficiencies, it is a primary object to provide to provide a method and system for implementing multiple-access in an uplink transmission signal in a wireless communication system.

Another object of the embodiments herein is to implementing, by a Base Station (BS), an uplink transmission configuration.

Another object of the embodiments herein is to signal, by the BS, a resource pool to a plurality of User Equipment's (UEs).

Another object of the embodiments herein is to allocate at least one resource block from the plurality of resource blocks in the resource pool using a dynamic resource allocation.

Another object of the embodiments herein is to allocate the at least one resource block from the plurality of resource blocks in the resource pool using a linked-list based dynamic resource allocation.

Another object of the embodiments herein is to allocate at least one resource block from the plurality of resource blocks in the resource pool using a semi-static resource allocation.

Another object of the embodiments herein is to allocate at least one resource block from the plurality of resource blocks in the resource pool using a static resource allocation.

Another object of the embodiments herein is to allocate at least one resource block from the plurality of resource blocks in the resource pool using a distributed resource allocation.

Another object of the embodiments herein is to allocate at least one resource block from the plurality of resource blocks in the resource pool using a contiguous resource allocation.

Another object of the embodiments herein is to receive, by the BS, an uplink transmission from the at least one UE among the plurality of UEs.

Another object of the embodiments herein is to attempt, by the BS, to decode the uplink transmission blindly based on a collision criteria.

Another object of the embodiments herein is to indicate, by the BS, to the at least one UE whether the attempt to decode the uplink transmission blindly is successful.

Another object of the embodiments herein is to obtain, by the UE, a resource pool from the BS.

Another object of the embodiments herein is to access the at least one RB from the plurality of RBs allocated in the resource pool.

Another object of the embodiments herein is to send the uplink transmission to the BS.

Another object of the embodiments herein is to select the at least one RB from the resource pool for the uplink transmission based on a level of randomness.

Another object of the embodiments herein is to select the at least one RB from the resource pool for the uplink transmission based on a coverage level.

Another object of the embodiments herein is to select the at least one RB from the resource pool for the uplink transmission based on an identifier.

Another object of the embodiments herein is to select the at least one RB from the resource pool for the uplink transmission based on a type of activity of the UE.

Another object of the embodiments herein is to select the at least one RB from the resource pool for the uplink transmission based on a two-step procedure.

Embodiments herein disclose a method for multiple-access in a wireless communication system. The method includes implementing, by a BS, an uplink transmission configuration including a resource pool having a plurality of RBs allocated to support a grant-free multiple access. Further, the method includes signaling, by the BS, the resource pool to a plurality of UEs.

In an embodiment, the at least one resource block from the plurality of resource blocks in the resource pool is allocated using a dynamic resource allocation.

In an embodiment, the at least one resource block from the plurality of resource blocks in the resource pool is allocated using a linked-list based dynamic resource allocation.

In an embodiment, the at least one resource block from the plurality of resource blocks in the resource pool is allocated using a semi-static resource allocation.

In an embodiment, the at least one resource block from the plurality of resource blocks in the resource pool is allocated using a distributed resource allocation.

In an embodiment, the at least one resource block from the plurality of resource blocks in the resource pool is allocated using a contiguous resource allocation.

In an embodiment, the dynamic resource allocation dynamically allocates the at least one resource block in the resource pool based on an indication from a group of UE's, where the group of UE's indicates the indication after one of an initial grant-free transmission, and a contention-based transmission.

In an embodiment, the dynamic resource allocation supports variable traffic loads.

In an embodiment, the at least one RB allocated based on the static resource allocation in the resource pool is signaled using System Information (SI).

In an embodiment, the at least one RB allocated based on the dynamic resource allocation in the resource pool is signaled using Downlink Control Information (DCI).

In an embodiment, the linked-list based dynamic resource allocates the at least one RB allocated in a portion in the resource pool and an allocated RB at each sub-portion of the portion points to other portion of allocation in the resource pool.

In an embodiment, the at least one RB allocated in the portion in the resource pool is signaled using the DCI.

In an embodiment, the resource pool is a grant-free resource pool.

In an embodiment, the resource pool is a contention-based resource pool.

In an embodiment, the method includes receiving, by the BS, an uplink transmission from the at least one UE from the plurality of UEs. The method includes attempting, by the BS, to decode the uplink transmission blindly based on a collision criteria. The method includes indicating, by the BS, to the at least one UE whether the attempt to decode the uplink transmission blindly is successful.

In an embodiment, the collision criteria includes at least one collision threshold to determine a decoding ability to identify different UEs despite contentions.

In an embodiment, the BS re-configures the resource pool in response to determining that the collision criteria is met while decoding the uplink transmission blindly from the at least one UE.

Embodiments herein disclose a method for multiple-access in a wireless communication system. The method includes obtaining, by a UE, a resource pool from a BS. The resource pool includes a plurality of RBs allocated to support a grant-free multiple access. Further, the method includes sending, by the UE, an uplink transmission to the BS by accessing at least one RB from the plurality of RBs allocated in the resource pool.

In an embodiment, the UE selects the at least one RB from the resource pool for the uplink transmission based on a level of randomness.

In an embodiment, the UE selects the at least one RB from the resource pool for the uplink transmission based on a coverage level.

In an embodiment, the UE selects the at least one RB from the resource pool for the uplink transmission based on a particular identifier.

In an embodiment, the UE selects the at least one RB from the resource pool for the uplink transmission based on at least one of a type of activity of the UE.

In an embodiment, the UE selects the at least one RB from the resource pool for the uplink transmission based on at least one of a two-step procedure.

In an embodiment, in the two-step procedure, the UE randomly accesses a first portion of the resource pool and after receiving an acknowledgement from the base station the UE then accesses a second portion of the resource pool, wherein the second portion is bigger than the first portion.

In an embodiment, the UE directly sends the uplink transmission by accessing the resource pool without receiving a grant from the BS.

Embodiments herein disclose a BS for multiple-access in a wireless communication system. The BS is configured to implement an uplink transmission configuration including a resource pool having a plurality of RBs allocated to support a grant-free multiple access. Further, the BS is configured to signal the resource pool to a plurality of UEs.

Embodiments herein disclose a UE for multiple-access in a wireless communication system. The UE is configured to obtain a resource pool from a BS. The resource pool includes a plurality of RBs allocated to support a grant-free multiple access. Further, the UE is configured to send an uplink transmission to the BS by accessing at least one RB from the plurality of RBs allocated in the resource pool.

Embodiments herein disclose a system for multiple-access in a wireless communication system. The system includes a BS configured to implement an uplink transmission configuration including a resource pool having a plurality of RBs allocated to support a grant-free multiple access. The BS is configured to signal the resource pool to a plurality of UEs. The UE from the plurality UEs is configured to receive the resource pool from the BS and send an uplink transmission to the BS by accessing at least one RB from the plurality of RBs allocated in the resource pool.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
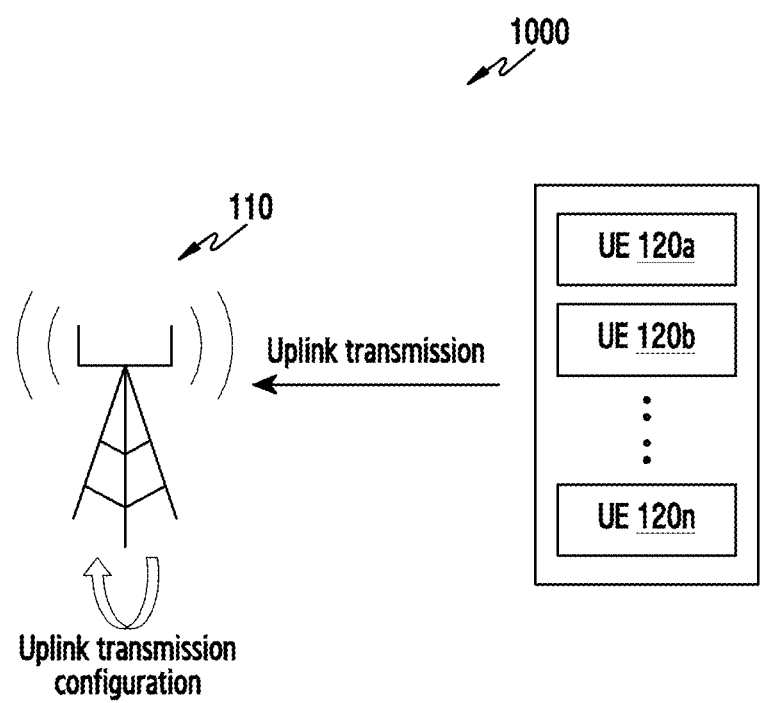
FIG. 1 illustrates an overview of a system for implementing multiple-access in a wireless communication system, according to an embodiment as disclosed herein.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Embodiments herein disclose a system and method for implementing multiple-access in a wireless communication system. The system includes a BS configured to implement an uplink transmission configuration including a resource pool having a plurality of RBs allocated to support a contention-based multiple access or a grant-free multiple access. The BS is configured to signal the resource pool to a plurality of UEs. The UE from the plurality UEs is configured to receive the resource pool from the BS and send an uplink transmission to the BS by accessing at least one RB from the plurality of RBs allocated in the resource pool.

Unlike the conventional methods and the conventional systems, the proposed method can be used to preconfigure the resource pool a priori which is signaled to the UEs, so that the UL transmission is autonomous and is not triggered by the BS. Further, the UE directly sends the uplink transmission by accessing the resource pool without receiving a grant from the BS.

The proposed method aids to re-use the resources so as to improve the spectral efficiency of the wireless communication system. The method enables to support massive number of users by re-using the resources in the wireless communication system.

The proposed method can be used to protect the users of the UE from having to repeat their data multiple times and increase the latency. In the proposed method, the number of collisions can be reduced while supporting the large number of users. Fall-back mechanisms can be used to quickly realize when the BS runs out of ability to support such large number of users and starts supporting the existing mechanisms.

The proposed method enables a Non-orthogonal multiple access (NOMA). The proposed method can be implemented in a licensed or un-licensed system for a fourth generation (4G) evolution system and a fifth generation (5G) system.

Referring now to the drawings and more particularly to FIGS. 1 through 8, where similar reference characters denote corresponding features consistently throughout the figure, there are shown preferred embodiments.

FIG. 1 is an overview of a system 1000 for implementing multiple-access in a wireless communication system, according to an embodiment as disclosed herein. In an embodiment, the system 1000 includes a BS 110 and a set of UEs 120a-120n (Hereafter label of the UE is 120). The UE 120 can be, for example but not limited to, a cellular phone, a tablet, a smart phone, a laptop, a Personal Digital Assistant (PDA), a global positioning system, a multimedia device, a video device, a game console, or the like.

The UE 102 may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. The UE 102 is compliant with multiple, different communication protocols that can operate as a multi-mode device by communicating within a 5G network and a 4G network employing any common type of LTE or LTE-Advanced (LTE-A) radio access technology (RAT).

The BS 110 may also be referred to as a base transceiver station, a radio base station, a radio transceiver, a transceiver function, a basic service set (BSS), an extended service set (ESS), eNB, or the like.

In an embodiment, the BS 110 is configured to implement an uplink transmission configuration including a resource pool having a plurality of RBs allocated to support the contention-based multiple access or the grant-free multiple access. The resource pool is the CB pool or the GF pool. The CB pool or the GF pool is the pool where there is no explicit grant procedure given to the UE 120 to access a specific time frequency resource. Instead a set of resources is indicated to the users of the UE 120 and they contend to use these resources among the UEs 120a-120n.

The resource pool includes at least the following:
a) Time and frequency resources, including resources for repetitions,
b) Modulation and coding scheme(s), possibly including Redundancy Version (RV), to be used, for example as reliability is low for the transmissions, low Modulation and Coding Scheme (MCS) values may be used by default but if there is explicit indication then the UE can switch to this MCS when a network thinks the load is less, and c) Reference signal parameters that can aid in the demodulation of a specific data transmissions on the grant-free resources or the set of resource block.

Figure 2A:
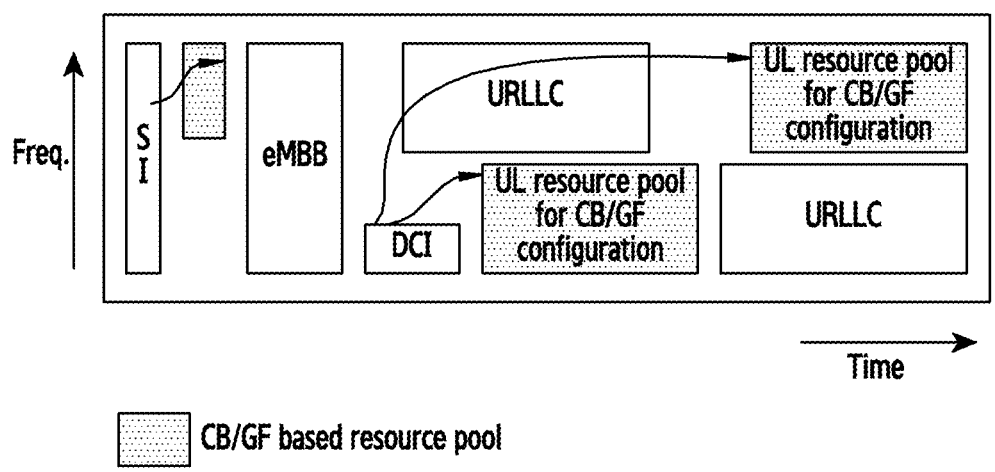
FIG. 2A illustrates a schematic view in which a resource block from the plurality of resource blocks in the resource pool is allocated using a distributed resource allocation, according to an embodiment as disclosed herein.

In an embodiment, the resource block from the plurality of resource blocks in the resource pool is allocated using a distributed resource allocation as shown in FIG. 2A.

Figure 2B:
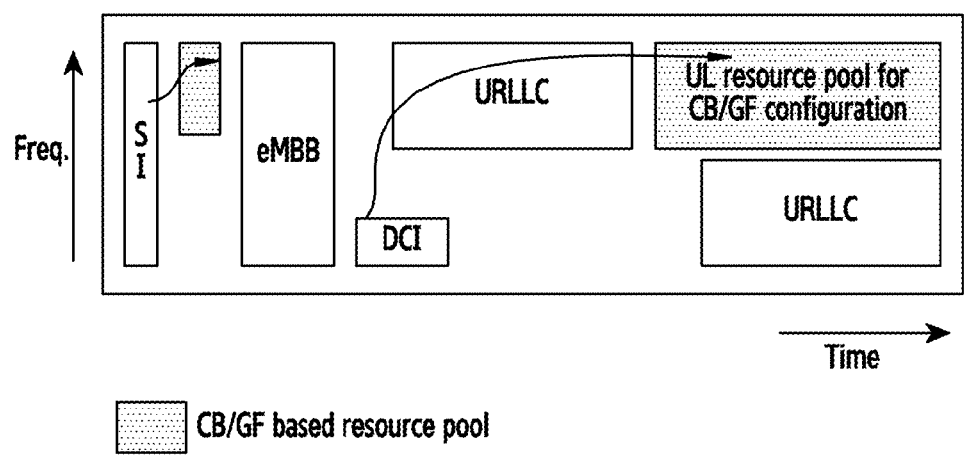
FIG. 2B illustrates a schematic view in which the resource block from the plurality of resource blocks in the resource pool is allocated using a contiguous resource allocation, according to an embodiment as disclosed herein.

In an embodiment, the resource block from the plurality of resource blocks in the resource pool is allocated using a contiguous resource allocation as shown in FIG. 2B.

Figure 2C:
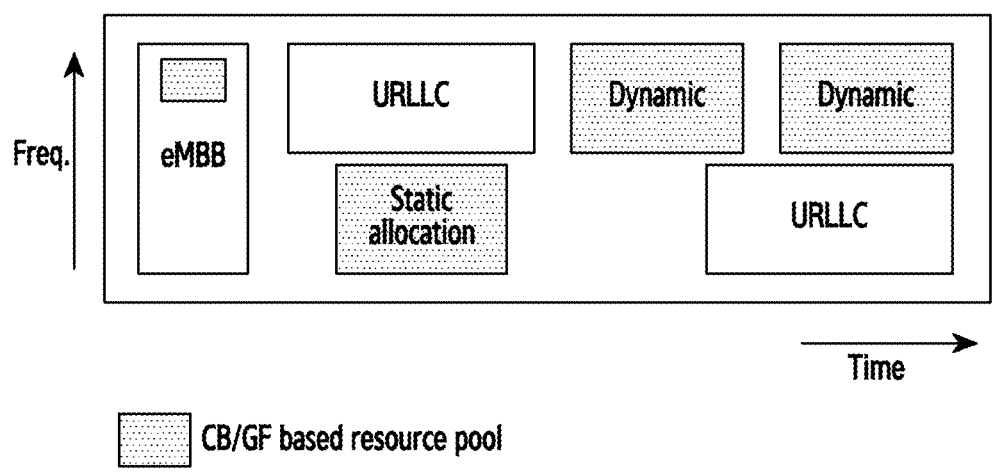
FIG. 2C illustrates a schematic view in which resource block from the plurality of resource blocks in the resource pool is allocated using a semi-static resource allocation, according to an embodiment as disclosed herein.
Figure 2D:
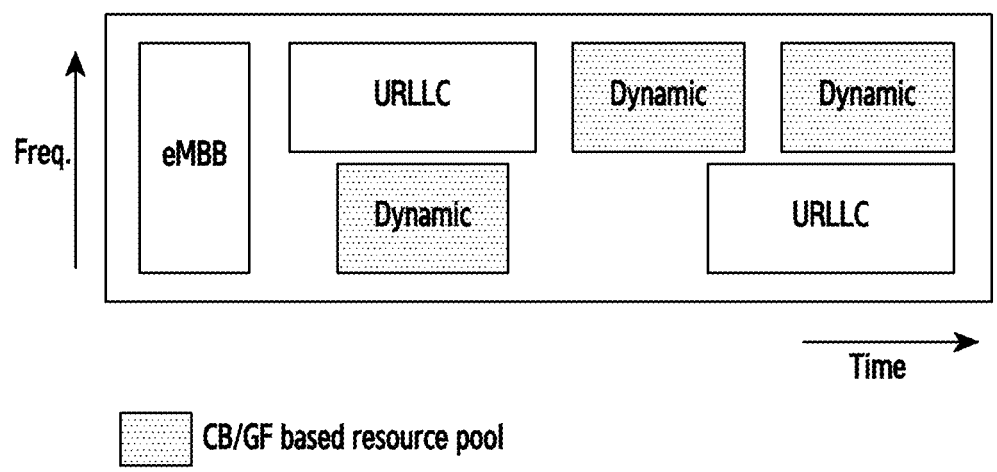
FIG. 2D illustrates a schematic view in which resource block from the plurality of resource blocks in the resource pool is allocated using a dynamic resource allocation, according to an embodiment as disclosed herein.

In an embodiment, the resource block from the plurality of resource blocks in the resource pool is allocated using a semi-static resource allocation as shown in FIG. 2C In an embodiment, the resource block from the plurality of resource blocks in the resource pool is allocated using a dynamic resource allocation as shown in FIG. 2D.

Figure 2E:
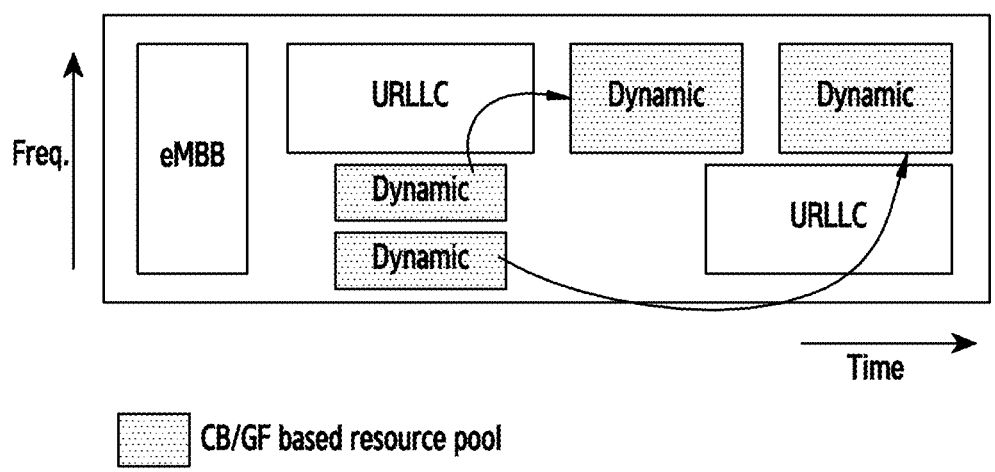
FIG. 2E illustrates a schematic view in which resource block from the plurality of resource blocks in the resource pool is allocated using a linked-list based dynamic resource allocation, according to an embodiment as disclosed herein.

In an embodiment, the resource block from the plurality of resource blocks in the resource pool is allocated using a linked-list based dynamic resource allocation as shown in FIG. 2E In an embodiment, the resource block from the plurality of resource blocks in the resource pool is allocated using a static resource allocation.

In an embodiment, since the service-specific resource allocations have been under discussion in a $3^{rd}$ Generation Partnership Project (3GPP), an eMBB, an URLLC, and a specific RB allocations (as an example) are shown in FIG. 2A. The gray color boxes indicate the set of RBs that are allotted for supporting the contention-based (CB) or Grand free (GF) configuration for whatever services (e.g., data service, voice call service, a multimedia service, or the like) may support it. Further, an implicit UE specific resource access mechanism can also be considered inside the CB/GF resource pool that can minimize the collisions.

As shown in the FIG. 2C, a static part enables to reduce latency and the static part will be a small portion in the pool. Although, some resources may go waste/un-used, the resource usage will still be better than signaling overhead for massive number of UE's 120-10n. The dynamic part can be allotted when a group of UE's 1201-120n (after initial grant-free/contention-based transmission) indicates such a necessity to the BS 110 which is similar to semi-persistent transmissions of mMTC UE's or when the number of users exceeds a threshold. The small dynamic allocation can remain valid for a few time instants (say across few frames). The dynamic resource allocation supports variable traffic loads and can avoid resource wastage. The static allocation may be signaled via SI or a Physical Broadcast Channel (PBCH) and the dynamic part via the DCI.

In an embodiment, the at least one RB allocated based on the static resource allocation in the resource pool is signaled using System Information (SI).

In an embodiment, the at least one RB allocated based on the dynamic resource allocation in the resource pool is signaled using Downlink Control Information (DCI).

In an embodiment, the at least one RB allocated in the portion in the resource pool is signaled using the DCI.

In an embodiment, the time/frequency resource containing at least one search space is obtained from a Master Information Block (MIB)/SI/implicitly derived from an initial access information.

In an embodiment, time/frequency resource containing additional search spaces can be configured using a dedicated Radio Resource Control (RRC) signaling.

In an embodiment, the dynamic resource allocation dynamically allocates the at least one resource block in the resource pool based on an indication from the group of UEs 120a-120n, where the group of UEs 120a-120n indicates the indication after one of an initial grant-free transmission, and a contention-based transmission.

In an embodiment, the linked-list based dynamic resource allocation may also be possible as shown in FIG. 2E. The linked-list based dynamic resource allocates the at least one RB allocated in a portion in the resource pool and an allocated RB at each sub-portion of the portion points to other portion of allocation in the resource pool.

In an embodiment, since the set of UEs 120a-120n access the resource pool, the BS 110 can use a Physical Downlink Control Channel (PDCCH) based on a Group Radio Network Temporary Identifier (G-RNTI) for all users with the grant-free configuration requirement to signify the resource pool when the grant-free configuration requirement has to be signaled via the DCI. Further, the BS 110 sends a trigger whenever the resource pool configuration is/has to change and can be indicated via broadcast or dedicated signaling depending on the type of the resource.

In an embodiment, the linked-list based dynamic resource allocates the at least one RB allocated in a portion in the resource pool and an allocated RB at each sub-portion of the portion points to other portion of allocation in the resource pool.

Further, the BS 100 is configured to send the signaling corresponding of the resource pool to the UEs 120a-120n. After sending the signaling corresponding of the resource pool to the UEs 120a-120n, the UE 120 from the set of UEs 120a-120n is configured to obtain the resource pool from the BS 100.

Figure 3A:
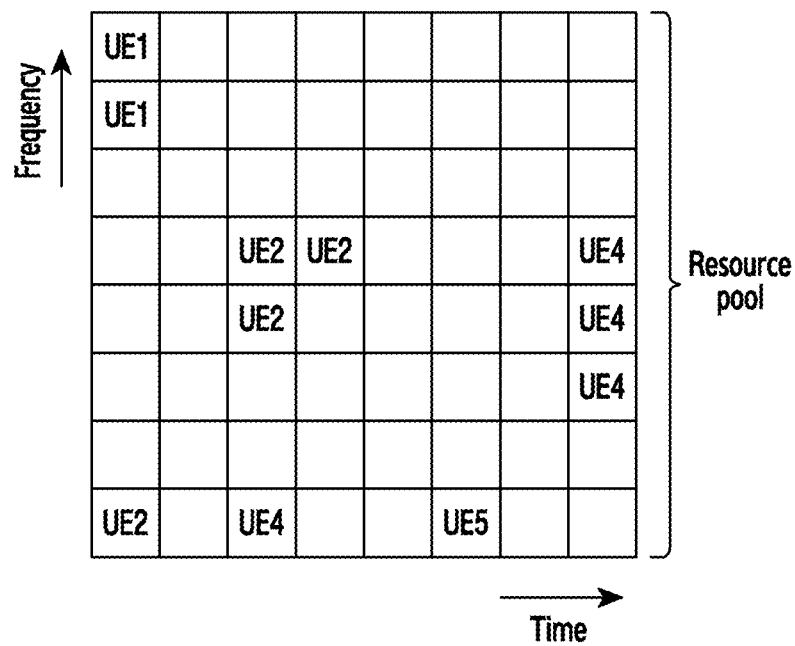
FIG. 3A illustrates a schematic view in which UE selects the resource block from the resource pool for the uplink transmission based on a level of randomness, according to an embodiment as disclosed herein.

In an embodiment, the UE 120 selects the resource block from the resource pool for the uplink transmission based on a level of randomness as shown in FIG. 3A.

In an embodiment, the UEs 120a-120n randomly chooses the RB's inside the resource pool. This is the simplest procedure that the UEs 120a-120n can utilize the RB's and there are no additional mechanisms for signaling needed. Further, since the access is completely random, there should be a default limitation on the number of RB's that the UEs 120a-120n can access in order to minimize the decoding complexity at the BS 110 and to reduce the number of collision while also maintaining fairness as shown in FIG. 3A.

In an embodiment, the UE 120 randomly chooses a set of RB-groups inside the resource pool.

Figure 3B:
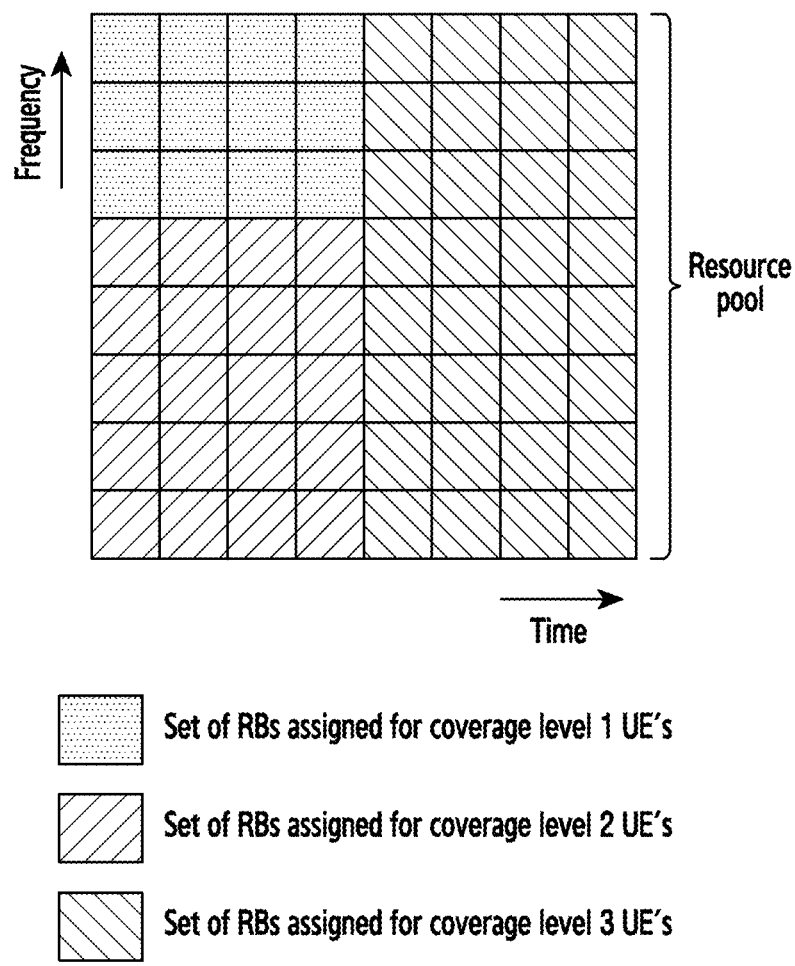
FIG. 3B illustrates a schematic view in which UE selects the resource block from the resource pool for the uplink transmission based on a coverage level, according to an embodiment as disclosed herein.

In an embodiment, the UE 120 selects the resource block from the resource pool for the uplink transmission based on a coverage level as shown in FIG. 3B.

In an embodiment, the UE 120 selects the RB from the resource pool for the uplink transmission based on the coverage level as shown in FIG. 3B. In an embodiment, the coverage level can be determined based on at least one of a Received Signal Strength Indicator (RSSI), a number of Hybrid Automatic Repeat Request (HARQ) repetitions, number of beam-pair training periods (can be explored for beam-forming based mmWave systems) or the like.

In an embodiment, users of the UE 120 belonging to different coverage level can perform a contention-based access jointly using multi-user decoding for the user separation at the BS 110 and priority handling for the users in different coverage levels and dynamic scheduling support.

In an embodiment, the UE 120 accessing the resource pool using the coverage level procedure reduces collisions as compared to the random access procedure. Further, since the coverage level also provides power levels of the BS 110, the power level can be used to enhance and aid the multi-user decoding capabilities.

Consider a scenario, the users of UEs 120a-120n are in lower coverage levels, when the coverage level is decided based on the power levels, then a larger pool may be allotted to the users of the UE 120a-120n to allow for more repetitions from these users. Even inside such a small pool, some default limitation on the number of repetitions may be enforced to allow fairness across the users.

Figure 3C:
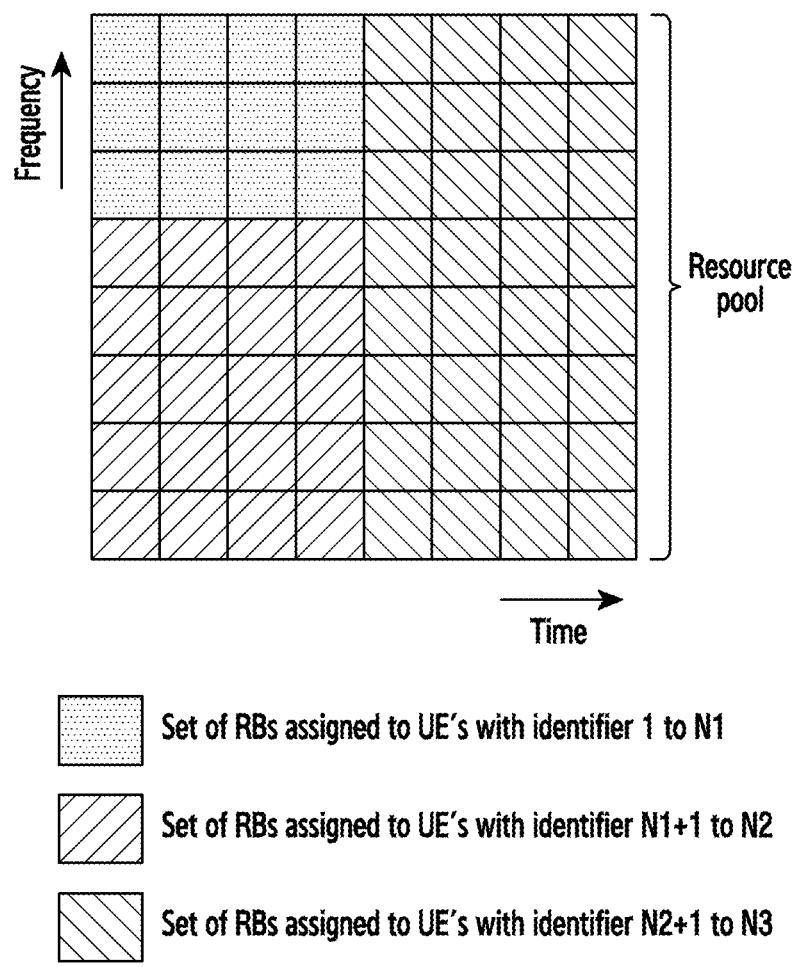
FIGS. 3C and 3D are illustrating schematic views in which UE selects the resource block from the resource pool for the uplink transmission based on a identifier of the UE, according to an embodiment as disclosed herein.
Figure 3D:
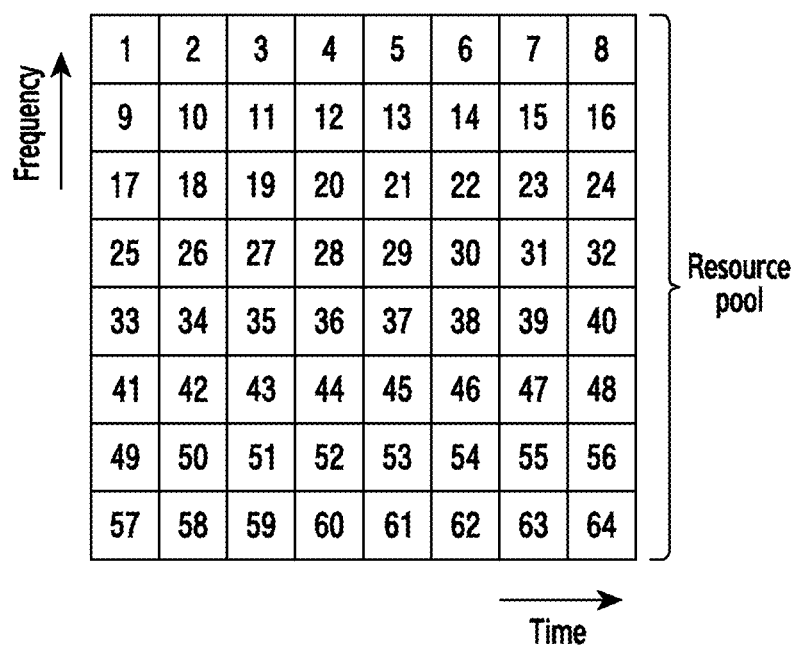

In an embodiment, the UE 120 selects the RB from the resource pool for the uplink transmission based on the identifier of the UE 120 as shown in the FIGS. 3C and 3D. As shown in FIG. 3C, the identifier can be, for example, but not limited to, a Cell Radio Network Temporary Identifier (C-RNTI), an International Mobile Subscriber Identity (IMSI), and an S-Temporary Mobile Subscriber Identity (S-TMSI) or the like.

In an embodiment, the UE 120 selects the RB from the resource pool for the uplink transmission based on a function of the identifier of the UE 120.

In an embodiment, the level of random ness can be added where users of the UEs 120 may choose ID's randomly from the resource pool decided by the BS 110 and then based on these IDs the UEs 120 can access the resource pool.

In an embodiment, the resource pool is numbered as shown in FIG. 3D. The following steps can be used by the UEs 120a-120n to access the specific RB's.

Step 1: The UE 120 with UE_ID will access the set of RB's which are a result of the equation UE_ID mod $N_1$ where $N_1$ is the total number of RB's in the resource pool, Step 2: The UE_ID can be for example IMSI mod 1024 (as used in paging procedure) or any other similar formulas UE_ID mod $N_{RB}$, 2*UE_ID mod $N_{RB}$, N limit*UE_ID mod $N_1$ will be the set of RB's that the UE 120 with UE_ID can use Where N limit is some limit on the set of RB's that each UE 120a-120n can use in the grant-free access mechanism If the UE 120 does not want to utilize all these resources, then the resource can randomize within this set to reduce further collisions. Further, the randomness also helps to reduce periodic collisions among the UEs 120a-120n which have same RB's over a period of time.

In an embodiment, a procedure for UEs 120 to access this resource pool is as follows:

Step 1: First find a common group, and

Figure 3E:
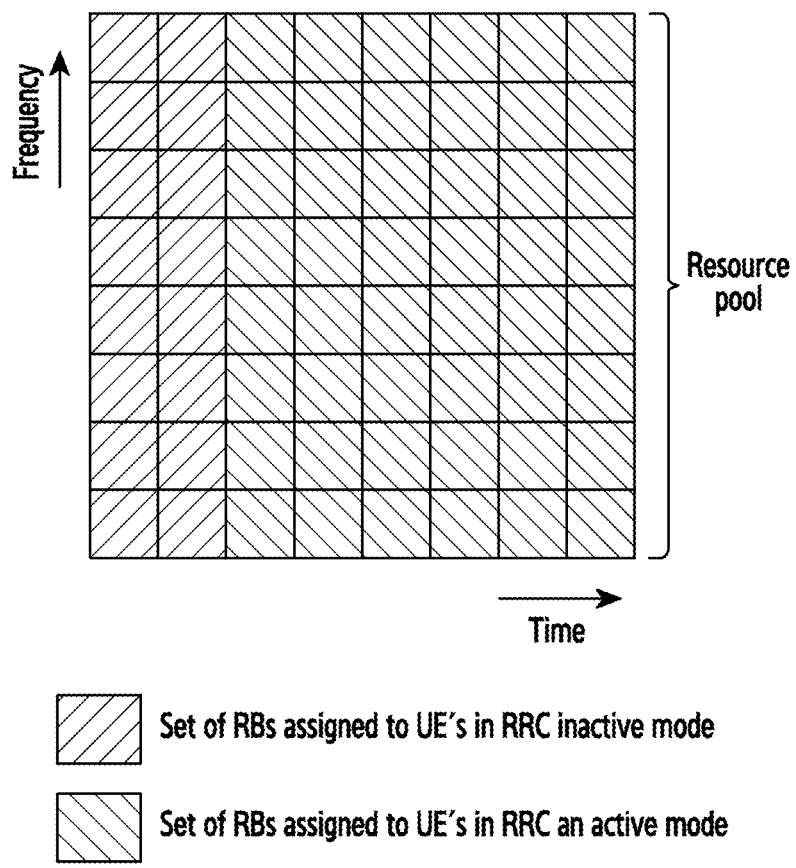
FIG. 3E illustrates a schematic view in which UE selects the resource block from the resource pool for the uplink transmission based on a type of activity of the UE, according to an embodiment as disclosed herein.

Step 2: Shift them from this group randomly (OFFSET is chosen uniformly at random by the UE's 10a-120n)

$$X \bmod N_{RB} = [(N_{RB}/N)*(UE\_ID \bmod N)] + (N_{RB}/N_s + \text{OFFSET});$$

Where X=set of RB's to access by the UE with UE_ID and N=Number of groups (common set of RB's where all UE's may access) Signaled by SIB, $N_s = \{N_{RB}/2, N_{RB}/4, N_{RB}/16, \ldots\}$=signaled by SIB, and OFFSET=$\{N_s+1, -N_s+2, \ldots, N_s-1\}$ In an embodiment, the UE 120 selects the resource block from the resource pool for the uplink transmission based on a type of activity of the UE 120 as shown in FIG. 3E.

In an embodiment, depending on the type of activity being performed by the UEs 120a-120n, the resources may be allotted as well. For instance, as shown in FIG. 3E depicts one such allocation where the UEs 120a-120n access the resource pool based on the RRC state (i.e., RRC_Active or RRC_Inactive) (similar to CELL_FACH in a Universal Mobile Telecommunications Service (UMTS)).

Figure 3F:
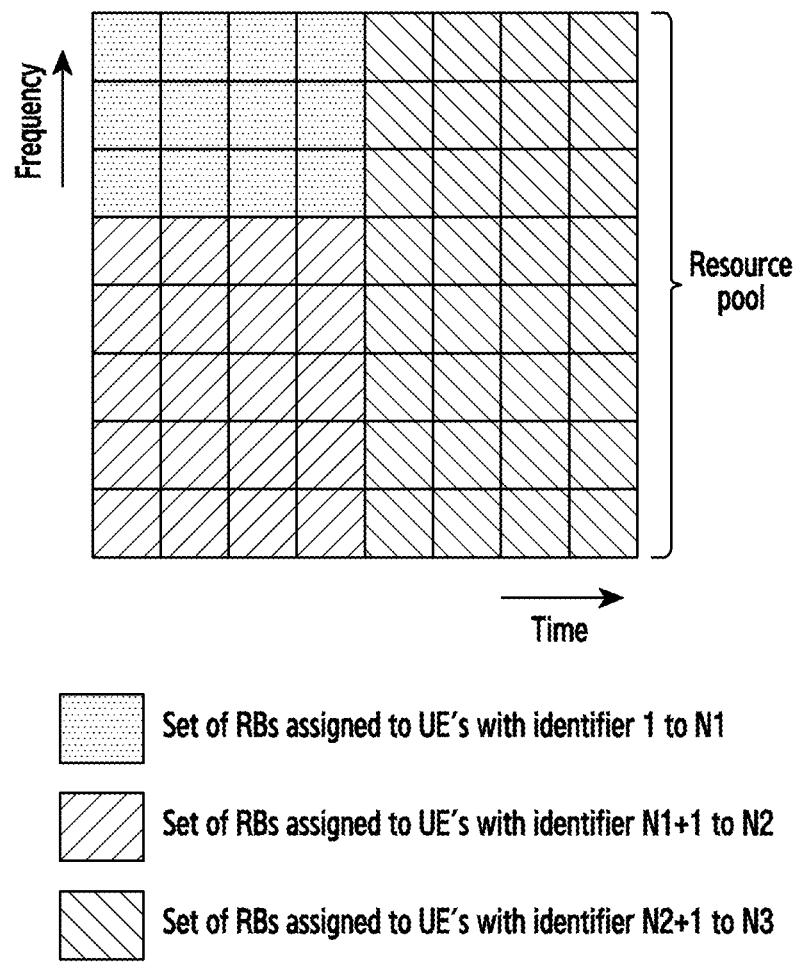
FIG. 3F illustrates a schematic view in which UE selects the resource block from the resource pool for the uplink transmission based a two-step procedure, according to an embodiment as disclosed herein.

In an embodiment, the UE 120 selects the resource block from the resource pool for the uplink transmission based a two-step procedure as shown in FIG. 3F. In the two-step procedure, the UE 120 randomly accesses a first portion of the resource pool. After receiving an acknowledgement from the BS 110, the UE 120 then accesses a second portion of the resource pool, wherein the second portion is bigger than the first portion.

In an example, the UE 120 first access the smaller pool (i.e., pool 1) randomly. If there is a success and an acknowledgment (ACK) is received from the BS 110, then there is an implicitly defined mapping to a bigger size pool (i.e., pool 2) based on the resources they accessed in the pool-1. If there is a Non-acknowledgment (NACK) received in the pool-1 access, then they will all access the common resource pool. The size of the default pool in the pool-2 will be larger than the pool size in the pool-1 to reduce the collisions among the users of the UEs 120a-120n which already collided in the pool-1.

Once the UE 120 receives the resource pool from the BS 110, the UE 120 sends the uplink transmission to the BS 110. After receiving the uplink transmission from the UE 120, the BS 110 is configured to attempt to decode the uplink transmission blindly based on a collision criteria.

In an embodiment, the collision criteria includes at least one collision threshold to determine a decoding ability to identify different UEs despite contentions.

Further, the BS 110 is configured to indicate a status (i.e., the attempt to decode the uplink transmission blindly is successful or not) to the UE 120.

In an embodiment, attempting to decode the uplink transmission blindly is not successful then the BS 110 re-configures the resource pool.

Under certain scenarios, the number of collisions may be too high and the BS 110 cannot be able to detect any user transmissions at all. Under such scenarios, the BS 110 may broadcast to the considered users to fall back to a grant-based mechanisms and avoid further collisions.

In an embodiment, the fall back mechanism is determined based on a collision criteria depends on a multi-user decoding ability of the BS 110 and its ability to identify the different users despite contentions. The number of collisions may be evaluated over a period of timer, which can be a tradeoff parameter that the BS 110 can choose when to fall back to a grant-based scheme.

In an embodiment, the fall back mechanism is used where based on two thresholds (i.e., level 1 and level 2), the BS 110 can either decide to re-configure the resource pool allocation hoping to reduce the collisions any time or if the number of collisions are beyond the $2^{nd}$ threshold, then the UE 120 can fall back to the grant-based mechanisms. These thresholds are a design parameter choice for the BS 110.

Inside each of the resource pools, the groups of UEs 120a-120n that have chosen the same resource can access the resource using the following a. The OFDM case indicates that each user does not use any other mechanism to aid the BS 110 to reduce collision. For other mechanisms, a differentiating factor such as code book, interleaver etc. may be used.

b. The UE 120 chooses the set of the RB's using the at least one of the level of randomness, the coverage level, the particular identifier, the type of activity of the UE 120, and the two-step procedure c. Each user randomly picks one Sparse Code Multiple Access (SCMA) code/Interleave-Division Multiple-Access (IDMA), an Interleave-Grid Multiple Access (IGMA) inter leaver code or some pattern for pattern division multiple access (PDMA) access.

d. The BS 110 performs "multi-user-decoding" blindly based on this access mechanism either based on differences in code-book/interleaver/power levels etc. Further, the BS 110 can indicate to the set of UE's again via the group signaling which type of mechanisms to use depending on what it can support and how many users it can support.

For re-transmissions, the BS 110 may signal the users to use Automatic Repeat Request (ARQ)-based mechanisms rather than HARQ-based mechanisms since it may or may not be possible to partially decode the data sent by the user when collisions occur.

However, if the ARQ based mechanisms are triggered then, the BS 110 can be indicated to the UEs 120a-120n, then UE 120 from the UEs 120a-120n can perform the UL transmission by combination of without grant based configuration and with grant based configuration so as to avoid very long re-transmissions in the wireless communication system. For example, the ARQ based mechanisms can be feasible where in some of the code blocks may be detected by the BS 110 among several code blocks sent by the users of the UEs 120a-120n and the rest may be corrupted due to collisions. In such case, if the UEs 120a-120n has been identified, either via C-RNTI (or some other identity) or via the DMRS ID or the like, then the BS 110 can indicate the user to selectively transmit some of the code blocks via the grant-based mechanism.

In an embodiment, the grant-free transmission with semi-static resource configuration can reduce latency for UL data transmissions since the signaling procedure is significantly simplified.

Further, the grant-free transmission is a trade-off between the resource utilization and the reliability of data transmission. If the resource configured for the grant-free transmission is assumed to be UE dedicated, which is similar to a LTE Semi Persistent Scheduling (SPS) transmission, reliability is increased but resource configuration may be inefficient since the UE-dedicated resource may not be frequently used depending on the traffic scenarios. The UE-group common resource configuration can improve the resource utilization but the contention-based nature of the UL data transmissions reduces the respective reliability when multiple UEs transmit in the same resources.

In order to support the switching between grant-free and grant-based transmission, the initial transmission on the pre-configured grant-free resource can include UE identification, for example, explicit UE ID information (e.g. C-RNTI) or implicit UE information such as a Demodulation Reference Signal (DMRS) cyclic shift (assuming use of ZC sequences) specific signature. Additionally, to indicate whether the UE 120 has remaining data to transmit and to facilitate grant-based subsequent transmission, the UE 120 can include a Buffer Status Report (BSR) with the initial data transmission. If the BS 110 successfully decodes the data transmission from the UE 120 and determines that the UE 120 has remaining data to transmit (e.g. from the BSR report), the BS 110 can switch scheduling for the UE to the grant-based transmissions. The UL grant for subsequent data transmissions can be with a Cyclic Redundancy Check (CRC) scrambled by the UE ID. If the decoding of the initial transmission fails but the BS 110 can determine that there is data transmission for example by identifying a transmitted DMRS RS in the configured resources, the switch between the grant-free and the grant-based transmission can apply and reliability of re-transmission is improved. Therefore, the DMRS properties, such as the DMRS cyclic shift, can be part of the overall resource configuration.

In an embodiment, the BS 110 can adaptively change the resources allocated for the grant-free transmission. For instance, the BS 110 is configured to monitor the collision level by using an interference level in the resource pool. If the BS 110 finds that the collisions are too high for the grant-free transmission, the BS 110 can change the resource allocations for the grant-free transmission to reduce the collision probability or even consider fallback to the grant-based transmission.

In an embodiment, if the UE 120 configured for the grant-free transmission does not receive the UL grant, the UE 120 will transmit the UL data by the grant-free transmission for new data and re-transmission data. However, if the UE 120 receives the UL grant, the grant-based transmission will be performed. This means that the received UL grant can override the grant-free transmission.

The FIG. 1 shows the limited overview of the system 1000 but, it is to be understood that other embodiments are not limited thereto. Further, the system 1000 includes any number of hardware or software components communicating with each other. By way of illustration, both an application running on a device and the device itself can be a component.

Figure 4:
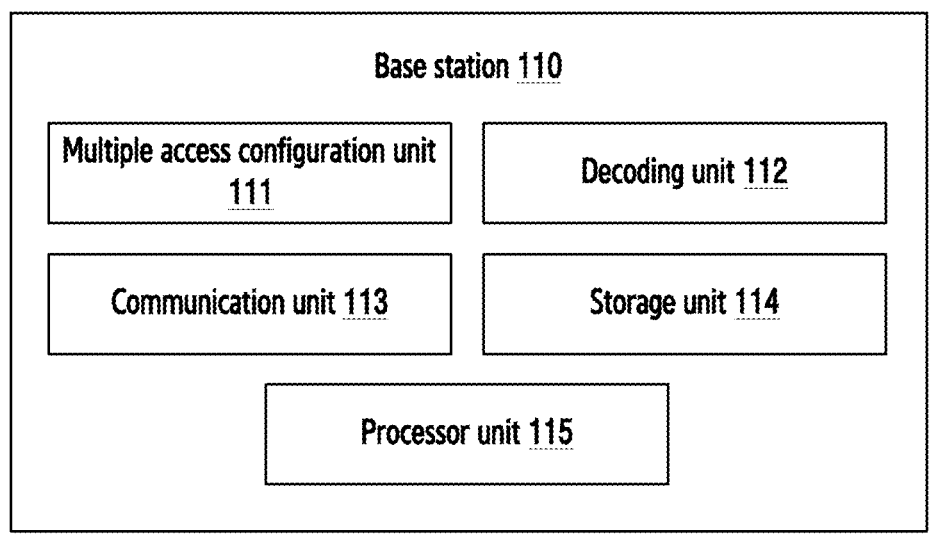
FIG. 4 illustrates various components of a BS, according to an embodiment as disclosed herein.

FIG. 4 illustrates various components of the BS 110, according to an embodiment as disclosed herein. In an embodiment, the BS 110 includes multiple access configuration unit 111, a decoding unit 112, a communication unit 113, a storage unit 114, and a processor unit 115. The processor unit 115 is in communication with the multiple access configuration unit 111, the decoding unit 112, the communication unit 113, and the storage unit 114. In some embodiments, the processor unit 115 may include at least one processor.

The multiple access configuration unit 111 is configured to implement the uplink transmission configuration including the resource pool having a plurality of RBs allocated to support the contention-based multiple access or the grant-free multiple access. After implementing the uplink transmission configuration, the multiple access configuration unit 111 is configured to signal the resource pool to a plurality of UEs 120a-120n.

Further, the decoding unit 112 is configured to receive the uplink transmission from the at least one UE from the plurality of UEs 120a-120n. After receiving the uplink transmission from the at least one UE from the plurality of UEs 120a-120n, the decoding unit 112 is configured to attempt to decode the uplink transmission blindly based on the collision criteria.

Based on attempting to decode the uplink transmission blindly based on the collision criteria, the decoding unit 112 is configured to indicate to the at least one UE 120 whether the attempt to decode the uplink transmission blindly is successful.

In an embodiment, the decoding unit 112 can adaptively change the resources allocated for the grant-free transmission. For instance, the decoding unit 112 is configured to monitor the collision level by using the interference level in the resource pool. If the decoding unit 112 identifies that the collisions are too high for the grant-free transmission, the multiple access configuration unit 111 can change the resource allocations for the grant-free transmission to reduce the collision probability or even consider fallback to the grant-based transmission.

The communication unit 113 is configured for communicating internally between internal units and with external devices via one or more networks. Accordingly, the communication unit 113 may be referred to as a transmission interface, a reception interface, a transmission and reception interface, a transmitter, a receiver or a transceiver. The storage unit 114 may include one or more computer-readable storage media. The storage unit 114 may include non-volatile storage elements. Examples of such non-volatile storage elements may include magnetic hard disc, optical discs, floppy discs, flash memories, or forms of electrically programmable memories (EPROM) or electrically erasable and programmable (EEPROM) memories. In addition, the storage unit 114 may, in some examples, be considered a non-transitory storage medium. The term "non-transitory" may indicate that the storage medium is not embodied in a carrier wave or a propagated signal. However, the term "non-transitory" should not be interpreted that the storage unit 114 is non-movable. In some examples, the storage unit 114 can be configured to store larger amounts of information than a memory. In certain examples, a non-transitory storage medium may store data that can, over time, change (e.g., in Random Access Memory (RAM) or cache).

Although FIG. 4 shows the hardware components of the BS 110 but it is to be understood that other embodiments are not limited thereon. In other embodiments, the BS 110 may include less or more number of components. Further, the labels or names of the components are used only for illustrative purpose and does not limit the scope of the disclosure. One or more components can be combined together to perform same or substantially similar function to manage the multiple-access in the wireless communication system.

Figure 5:
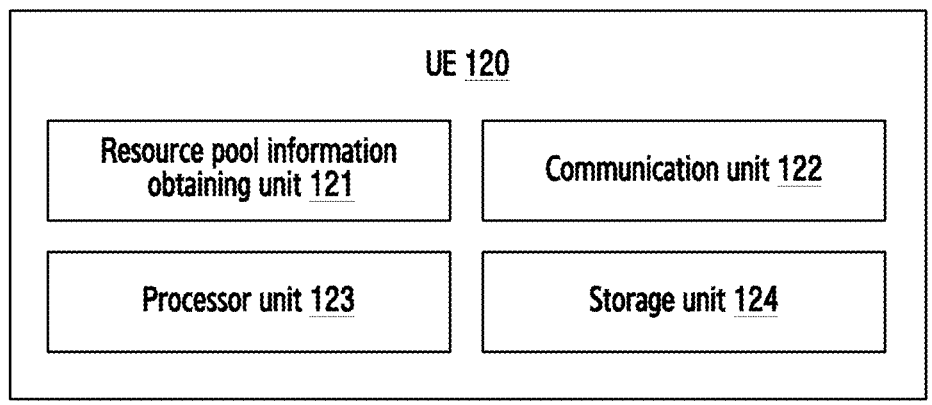
FIG. 5 illustrates various components of a UE, according to an embodiment as disclosed herein.

FIG. 5 illustrates various components of the UE 120, according to an embodiment as disclosed herein. In an embodiment, the UE 120 includes a resource pool information obtaining unit 121, a communication unit 122, a processor unit 123, and a storage unit 124. The resource pool information obtaining unit 121 is configured to obtain the resource pool from the BS 110. After obtaining the resource pool from the BS 110, resource pool information obtaining unit 121 is configured to send the uplink transmission to the BS 110 by accessing at least one RB from the plurality of RBs allocated in the resource pool.

The processor unit 123 is in communication with the resource pool information obtaining unit 121, the communication unit 122, and the storage unit 124. In some embodiments, the processor unit 123 may include at least one processor. The communication unit 122 is configured for communicating internally between internal units and with external devices via one or more networks. Accordingly, the communication unit 122 may be referred to as a transmission interface, a reception interface, a transmission and reception interface, a transmitter, a receiver or a transceiver. The storage unit 124 may include one or more computer-readable storage media. The storage unit 124 may include non-volatile storage elements. Examples of such non-volatile storage elements may include magnetic hard disc, optical discs, floppy discs, flash memories, or forms of electrically programmable memories (EPROM) or electrically erasable and programmable (EEPROM) memories. In addition, the storage unit 124 may, in some examples, be considered a non-transitory storage medium. The term "non-transitory" may indicate that the storage medium is not embodied in a carrier wave or a propagated signal. However, the term "non-transitory" should not be interpreted that the storage unit 124 is non-movable. In some examples, the storage unit 124 can be configured to store larger amounts of information than a memory. In certain examples, a non-transitory storage medium may store data that can, over time, change (e.g., in Random Access Memory (RAM) or cache).

Although FIG. 5 shows hardware components of the UE 120 but it is to be understood that other embodiments are not limited thereon. In other embodiments, the UE 120 may include less or more number of components. Further, the labels or names of the components are used only for illustrative purpose and does not limit the scope of the disclosure. One or more units can be combined together to perform same or substantially similar function to manage the multiple-access in the wireless communication system.

Figure 6:
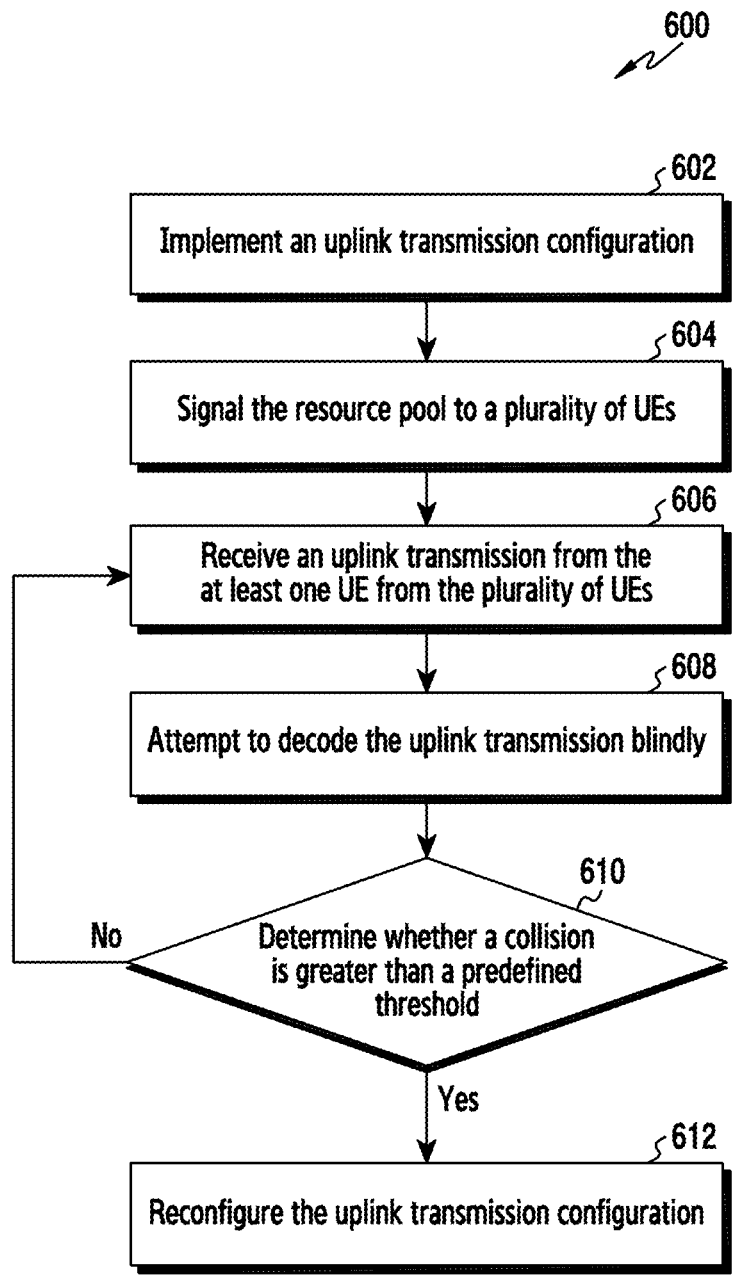
FIGS. 6 and 7 are illustrating flow diagrams of a method for implementing, by the BS, the multiple-access in the wireless communication system, while decoding the uplink transmission blindly from the UE, according to an embodiment as disclosed herein.
Figure 7:
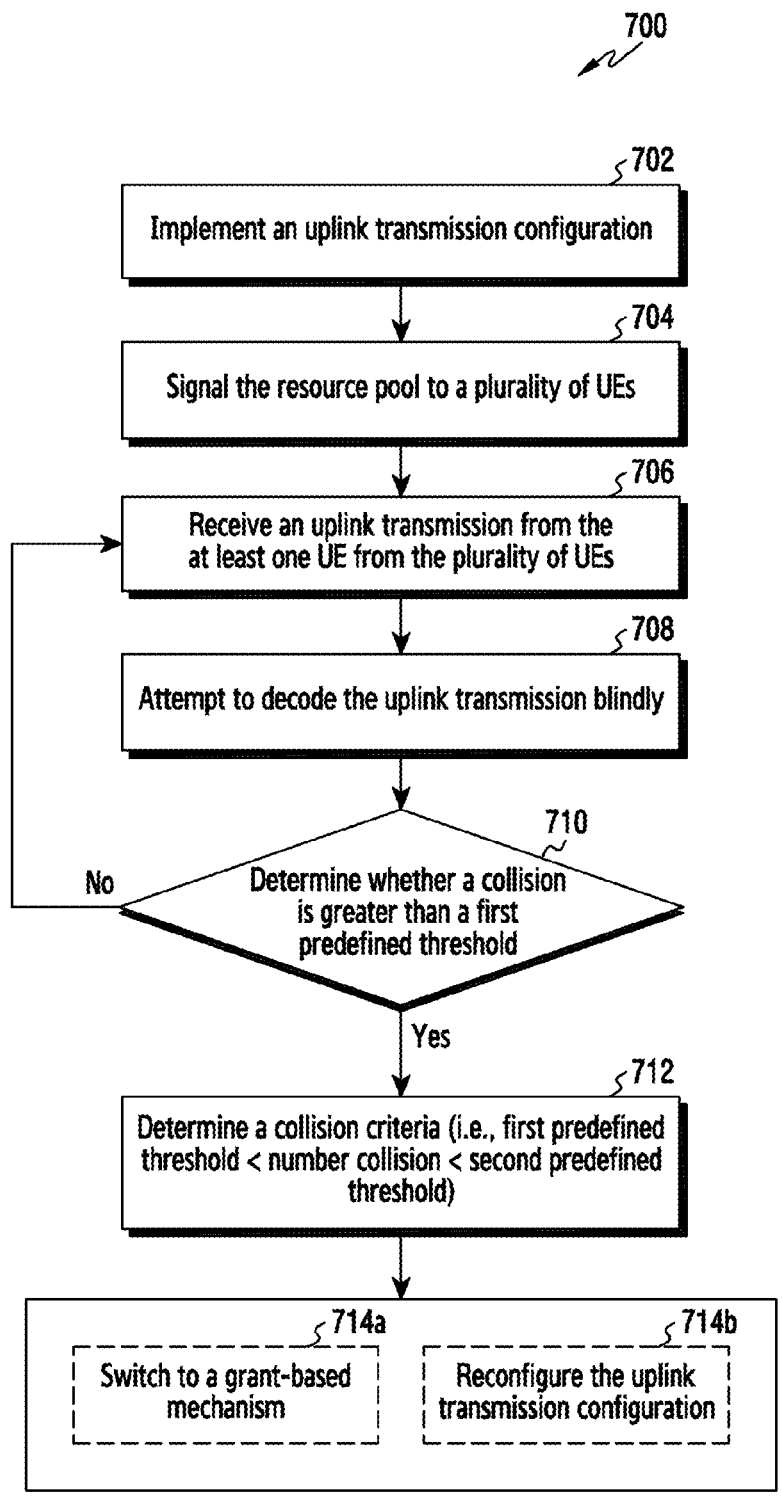

FIGS. 6 and 7 are illustrating flow diagrams 600 and 700 of a method for implementing, by the BS 110, the multiple-access in the wireless communication system, while decoding the uplink transmission blindly from the UE 120, according to an embodiment as disclosed herein.

As shown in FIG. 6, at 602, the method includes implementing the uplink transmission configuration. In an embodiment, the method allows the multiple access configuration unit 111 to implement the uplink transmission configuration. At 604, the method includes signaling the resource pool to the plurality of UEs 120a-120n. In an embodiment, the method allows the multiple access configuration unit 111 to signal the resource pool to the plurality of UEs 120. At 606, the method includes receiving the uplink transmission from the at least one UE from the plurality of UEs 120a-120n. In an embodiment, the method allows the multiple access configuration unit 111 to receive the uplink transmission from the at least one UE among the plurality of UEs 120a-120n.

At 608, the method includes attempting to decode the uplink transmission blindly. In an embodiment, the method allows the decoding unit 112 to attempt to decode the uplink transmission blindly. At 610, the method includes determining whether the collision is greater than a predefined threshold. In an embodiment, the method allows the decoding unit 112 to determine whether the collision is greater than the predefined threshold.

If the collision is greater than the predefined threshold, at 612, the method includes reconfiguring the uplink transmission configuration. In an embodiment, the method allows the multiple access configuration unit 111 to reconfigure the uplink transmission configuration. If the collision is less than the predefined threshold, at 606, the method includes receiving the uplink transmission from the at least one UE among the plurality of UEs 120a-120n.

As shown in FIG. 7, at 702, the method includes implementing the uplink transmission configuration. In an embodiment, the method allows the multiple access configuration unit 111 to implement the uplink transmission configuration. At 704, the method includes signaling the resource pool to the plurality of UEs 120a-120n. In an embodiment, the method allows the multiple access configuration unit 111 to signal the resource pool to the plurality of UEs 120. At 706, the method includes receiving the uplink transmission from the at least one UE from the plurality of UEs 120a-120n. In an embodiment, the method allows the multiple access configuration unit 111 to receive the uplink transmission from the at least one UE among the plurality of UEs 120a-120n.

At 708, the method includes attempting to decode the uplink transmission blindly. In an embodiment, the method allows the decoding unit 112 to attempt to decode the uplink transmission blindly. At 710, the method includes determining whether the collision is greater than a first predefined threshold. In an embodiment, the method allows the decoding unit 112 to determine whether the collision is greater than the first predefined threshold.

If the collision is less than the predefined threshold then, at 706, the method includes receiving the uplink transmission from the at least one UE among the plurality of UEs 120a-120n. If the collision is greater than the first predefined threshold then, at 712, the method includes determining the collision criteria (i.e., first predefined threshold<number collision<second predefined threshold). If the BS 110 determines that there is a more collision then, at 714a, the method includes switching to the grant-based mechanism. If the BS 110 determines that there is a more collision then, at 714b, the method includes reconfiguring the uplink transmission configuration.

In an embodiment, the fall back mechanism is determined based on the collision criteria depends on the multi-user decoding ability of the BS 110 and its ability to identify the different users despite contentions. The number of collisions may be evaluated over the timer, which can be a tradeoff parameter that the BS 110 can choose when to fall back to the grant-based configuration.

In an embodiment, the fall back mechanism is used where based on two thresholds (i.e., first predefined threshold and second predefined threshold), the BS 110 can either decide to re-configure the resource pool configuration hoping to reduce the collisions any time or if the number of collisions are beyond the second predefined threshold, then the UE 120 can fall back to the grant-based mechanisms. These thresholds are a design parameter choice for the BS 110.

For re-transmissions, the BS 110 may signal the users to use Automatic Repeat Request (ARQ)-based mechanisms rather than HARQ-based mechanisms since it may or may not be possible to partially decode the data sent by the user when collisions occur.

In an embodiment, the grant-free transmission with semi-static resource configuration can reduce latency for UL data transmissions since the signaling procedure is significantly simplified.

Further, the grant-free transmission is a trade-off between the resource utilization and the reliability of data transmission. If the resource configured for the grant-free transmission is assumed to be UE dedicated, which is similar to a LTE Semi Persistent Scheduling (SPS) transmission, reliability is increased but resource configuration may be inefficient since the UE-dedicated resource may not be frequently used depending on the traffic scenarios. The UE-group common resource configuration can improve the resource utilization but the contention-based nature of the UL data transmissions reduces the respective reliability when multiple UEs transmit in the same resources.

In order to support the switching between grant-free and grant-based transmission, the initial transmission on the pre-configured grant-free resource can include UE identification, for example, explicit UE ID information (e.g. C-RNTI) or implicit UE information such as the DMRS cyclic shift (assuming use of ZC sequences) specific signature. Additionally, to indicate whether the UE 120 has remaining data to transmit and to facilitate grant-based subsequent transmission, the UE 120 can include a BSR with the initial data transmission. If the BS 110 successfully decodes the data transmission from the UE 120 and determines that the UE 120 has remaining data to transmit (e.g. from the BSR report), the BS 110 can switch scheduling for the UE to the grant-based transmissions. The UL grant for subsequent data transmissions can be with the CRC scrambled by the UE ID. If the decoding of the initial transmission fails but the BS 110 can determine that there is data transmission for example by identifying a transmitted DMRS RS in the configured resources, the switch between the grant-free and the grant-based transmission can apply and reliability of re-transmission is improved. Therefore, the DMRS properties, such as the DMRS cyclic shift, can be part of the overall resource configuration.

In an embodiment, the BS 110 can adaptively change the resources allocated for the grant-free transmission. For instance, the BS 110 is configured to monitor the collision level by using an interference level in the resource pool. If the BS 110 finds that the collisions are too high for the grant-free transmission, the BS 110 can change the resource allocations for the grant-free transmission to reduce the collision probability or even consider fallback to the grant-based transmission.

In an embodiment, if the UE 120 configured for the grant-free transmission does not receive the UL grant, the UE 120 will transmit the UL data by the grant-free transmission for new data and re-transmission data. However, if the UE 120 receives the UL grant, the grant-based transmission will be performed. This means that the received UL grant can override the grant-free transmission.

The various actions, acts, blocks, steps, or the like in the flow diagrams 600 and 700 may be performed in the order presented, in a different order or simultaneously. Further, in some embodiments, some of the actions, acts, blocks, steps, or the like may be omitted, added, modified, skipped, or the like without departing from the scope of the disclosure.

Figure 8:
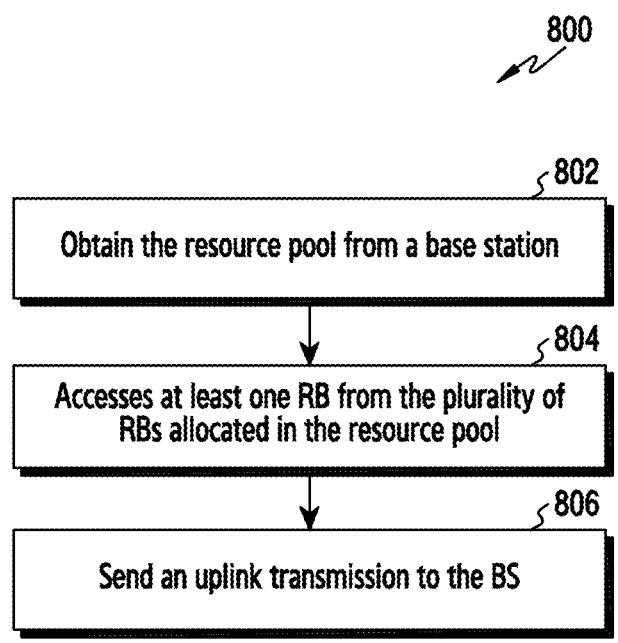
FIG. 8 is a flow diagram illustrating a method for implementing, by the UE, the multiple-access in the wireless communication system, according to an embodiment as disclosed herein.

FIG. 8 is a flow diagram 800 illustrating a method for implementing, by the UE 120, the multiple-access in the wireless communication system, according to an embodiment as disclosed herein. At 802, the method includes obtaining the resource pool from the BS 110. The resource pool includes the plurality of RBs allocated to support one of the contention-based multiple access and the grant-free multiple access. In an embodiment, the method allows the resource pool information obtaining unit 121 to obtain the resource pool from the BS 110. At 804, the method includes accessing the RB from the plurality of RBs allocated in the resource pool. In an embodiment, the method allows the resource pool information obtaining unit 121 to access the at least one RB from the plurality of RBs allocated in the resource pool.

At 806, the method includes sending the uplink transmission to the BS 110. In an embodiment, the method allows the resource pool information obtaining unit 121 to send the uplink transmission to the BS 110 based on accessing the at least one RB from the plurality of RBs allocated in the resource pool.

The various actions, acts, blocks, steps, or the like in the flow diagram 800 may be performed in the order presented, in a different order or simultaneously. Further, in some embodiments, some of the actions, acts, blocks, steps, or the like may be omitted, added, modified, skipped, or the like without departing from the scope of the disclosure.

The embodiments disclosed herein can be implemented through at least one software program running on at least one hardware device and performing network management functions to control the elements. The elements shown in the FIGS. 1 to 8 include blocks, elements, actions, acts, steps, or the like which can be at least one of a hardware device, or a combination of hardware device and software module.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a terminal in a wireless communication system, the method comprising:
    obtaining, from a base station, a resource pool supporting a grant-free multiple access, wherein the resource pool comprises a plurality of resource blocks (RBs); and
    transmitting, to the base station, an uplink signal by using at least one RB, determined by the terminal, from the plurality of RBs,
    wherein a configuration for the grant-free multiple access is changed by the base station, based on a result of a decoding blindly for a plurality of uplink signals comprising the uplink signal.

2. The method of claim 1, further comprising:
    selecting the at least one RB from the resource pool for the uplink signal based on at least one of a coverage level, a particular identifier, or a type of activity of the terminal.

3. The method of claim 1, further comprising:
    randomly accessing a first portion of the resource pool; and
    if receiving an acknowledgement from a network, accessing a second portion of the resource pool,
    wherein the second portion is bigger than the first portion.

4. An apparatus for a base station in a wireless communication system, the apparatus comprising:
    a transceiver; and
    at least one processor operatively coupled with the transceiver,
    wherein the at least one processor is configured to:
        determine an uplink transmission configuration comprising a resource pool supporting a grant-free multiple access, wherein the resource pool comprises a plurality of resource blocks (RBs); and
        transmit information for indicating the resource pool to a plurality of terminals; and
        change a configuration for the grant-free multiple access, based on a result of a decoding blindly for a plurality of uplink signals comprising an uplink signal.

5. The apparatus of claim 4, wherein at least one RB from the plurality of RBs in the resource pool is allocated by using at least one of a linked-list based allocation, a partially static and partially dynamic resource allocation, a distributed resource allocation, or a contiguous resource allocation.

6. The apparatus of claim 4, wherein at least one RB in the resource pool is allocated dynamically by using a dynamic resource allocation, based on an indication from a group of terminals, after an initial grant-free transmission, and a contention-based transmission.

7. The apparatus of claim 6, wherein the dynamic resource allocation supports variable traffic loads.

8. The apparatus of claim 5, wherein the at least one RB allocated based on the partially static and partially dynamic resource allocation in the resource pool is signaled using system information (SI).

9. The apparatus of claim 6, wherein the at least one RB allocated based on the dynamic resource allocation in the resource pool is signaled by using downlink control information (DCI).

10. The apparatus of claim 5, wherein the linked-list based allocation allocates the at least one RB in a portion in the resource pool, and an allocated RB at at least one sub-portion of the portion points to another portion of allocation in the resource pool.

11. The apparatus of claim 10, wherein the at least one RB allocated in the portion in the resource pool is signaled by using downlink control information (DCI).

12. The apparatus of claim 4, wherein the resource pool is a grant-free resource pool.

13. The apparatus of claim 4, wherein the at least one processor is further configured to:
    receive the uplink signal from at least one terminal among the plurality of terminals;
    perform decoding for the uplink signal blindly; and
    transmit, to the at least one terminal, a signal for indicating whether the decoding for the uplink signal blindly is successful based on at least one threshold value.

14. The apparatus of claim 13, wherein the at least one threshold value is determined for indicating a decoding ability to identify different terminals despite contentions.

15. The apparatus of claim 4, wherein, if a number of collisions is greater than a threshold value, the at least one processor is further configured to re-configure the resource pool for the grant-free multiple access, or switch to a mode for a grant-based transmission.

16. An apparatus for a terminal in a wireless communication system, the apparatus comprising:
    a transceiver; and
    at least one processor operatively coupled with the transceiver,
    wherein the at least one processor is configured to:
        obtain, from a base station, a resource pool supporting a grant-free multiple access, wherein the resource pool comprises a plurality of resource blocks (RBs); and
        transmit, to the base station, an uplink signal by using at least one RB, determined by the terminal, from the plurality of RBs,
        wherein a configuration for the grant-free multiple access is changed by the base station, based on a result of a decoding blindly for a plurality of uplink signals comprising the uplink signal.

17. The apparatus of claim 16, wherein the at least one processor is further configured to select the at least one RB from the resource pool for the uplink signal based on at least one of, a coverage level, a particular identifier, or a type of activity of the terminal.

18. The apparatus of claim 16, wherein the at least one processor is further configured to:
    randomly access a first portion of the resource pool, and
    if receiving an acknowledgement from a network, access a second portion of the resource pool,
    wherein the second portion is bigger than the first portion.

19. The method of claim 1, wherein, if a number of collisions is greater than a threshold value, the configuration is changed by re-configuring the resource pool for the grant-free multiple access, or switching to a mode for a grant-based transmission.

20. The apparatus of claim 16, wherein, if a number of collisions is greater than a threshold value, the configuration for the grant-free multiple access is changed by re-configuring the resource pool for the grant-free multiple access, or switching to a mode for a grant-based transmission.

* * * * *